(12) United States Patent
Chen et al.

(10) Patent No.: US 12,429,380 B2
(45) Date of Patent: Sep. 30, 2025

(54) CAMERA MODULE AND ELECTRONIC DEVICE

(71) Applicant: Rayprus Technology (Foshan) Co., Ltd., Foshan (CN)

(72) Inventors: Shu-Ying Chen, New Taipei (TW); Ye-Quang Chen, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 212 days.

(21) Appl. No.: 18/236,324

(22) Filed: Aug. 21, 2023

(65) Prior Publication Data

US 2024/0426666 A1    Dec. 26, 2024

(30) Foreign Application Priority Data

Jun. 20, 2023   (CN) .......................... 202310742128.4

(51) Int. Cl.
| | |
|---|---|
| *G01J 5/00* | (2022.01) |
| *G01J 5/061* | (2022.01) |
| *G01J 5/10* | (2006.01) |
| *G01J 5/48* | (2022.01) |

(52) U.S. Cl.
CPC ................. *G01J 5/061* (2013.01); *G01J 5/10* (2013.01); *G01J 5/48* (2013.01); *G01J 2005/063* (2013.01)

(58) Field of Classification Search
CPC ........ G01J 2005/063; G01J 5/061; G01J 5/10; G01J 5/48
See application file for complete search history.

(56) References Cited

U.S. PATENT DOCUMENTS

2012/0211655 A1 * 8/2012 Koide .................... H04N 23/95
250/330
2019/0102873 A1    4/2019 Wang et al.

FOREIGN PATENT DOCUMENTS

| | | |
|---|---|---|
| CN | 111879417 A | 11/2020 |
| JP | 2010-252268 A | 11/2010 |
| JP | 2021-081362 A | 5/2021 |
| TW | 201933176 A | 8/2019 |
| WO | 2018/230223 A1 | 12/2018 |

\* cited by examiner

*Primary Examiner* — Dani Fox
(74) *Attorney, Agent, or Firm* — ScienBiziP, P.C.

(57) ABSTRACT

Disclosed in the present invention are a camera module and an electronic device. The camera module includes a housing, a temperature sensor, a temperature adjusting device, and an infrared detector, the temperature sensor is configured to sense a first temperature in the interior of the housing, the temperature adjusting device is configured to adjust the first temperature to a target temperature when the first temperature is not equal to the target temperature, the infrared detector is configured to detect infrared rays of an object when the first temperature reaches the target temperature.

18 Claims, 6 Drawing Sheets

CAMERA MODULE AND ELECTRONIC DEVICE

FIELD

The present disclosure relates to the technical field of electronic devices, in particular to a camera module and an electronic device.

BACKGROUND

An infrared camera includes a camera module, and an infrared detector is provided in the housing of the camera module, and temperature variations around the infrared detector can affect infrared rays received by the infrared detector from an object. In order to improve detection accuracy of the infrared detector, the infrared camera stores a ratio of the temperatures inside and outside the housing when they are in equilibrium. When the temperature inside and outside the housing of the camera module reaches an equilibrium state, the infrared camera can identify the temperature generated by the infrared rays of the object obtained by the infrared detector based on relevant algorithm. The infrared camera is able to obtain an exact temperature of the object to enable more accurate thermograms to be generated based on the exact temperature.

The camera module mainly relies on the temperature conduction of a device itself or air convection, so that the temperature outside the housing and the temperature inside the housing are in equilibrium, and this process takes about 15 to 20 minutes, which takes more time and affects the experience of use.

Therefore, improvement is desired.

DETAILED DESCRIPTION

In the description of the present disclosure, the terms "first", "second" are only used to distinguish the purpose of the description and cannot be understood as indicating or implying relative importance, nor can they be understood as indicating or implying order.

Figure 1:
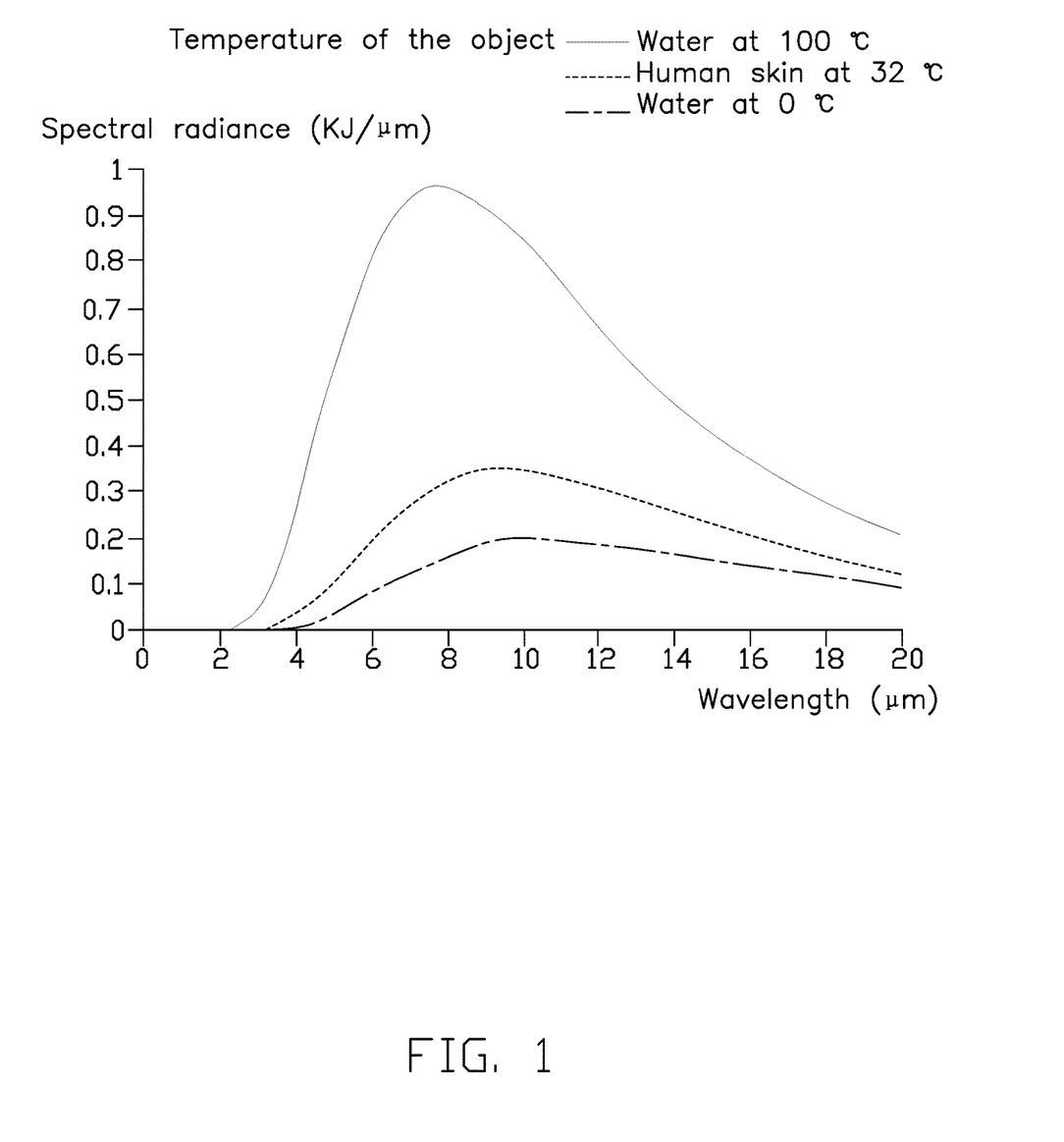
FIG. 1 is a spectral schematic of spectrum of infrared ray radiated by different objects. based on an embodiment of the present disclosure.

When temperature of an object exceeds an absolute zero (such as −273° C.), molecules and atoms of an object will move irregularly and its surface will continuously radiate the infrared rays. The higher the temperature, the more intense the irregular movement, and the higher the infrared energy emitted by the object. For example, FIG. 1 shows a spectral schematic of spectrum of infrared ray radiated by different objects, the horizontal axis represents the wavelength of the infrared ray, and the ordinate axis represents the spectral radiance of the infrared ray. As shown in FIG. 1, the wavelength and spectral radiance of the infrared ray from the surfaces of different objects at different temperatures are different, and the energy corresponding to the peak wave of FIG. 1 can be calculated by Wien's displacement law. For example, the peak wave of water at 0° C. is about 10 μm, and the spectral radiance corresponding to the peak wave is about 0.2 kJ/μm. The energy is about 0.2 kJ, the peak wave of water at 100° C. is about 8 μm, the spectral radiance corresponding to the peak wave is about 0.98 kJ/μm, and the energy is about 7.8 kJ.

An infrared camera includes a camera module and a processor, and the camera module is provided with an infrared detector. After receiving the infrared rays from the object, the sensitive components of the infrared detector, such as temperature resistance, will generate electrical signals based on changes in infrared energy. The camera module sends the electrical signals to the processor, and the processor collects the electrical signals and processes the electrical signals in conjunction with relevant algorithms to generate thermal imaging images of the object.

The environmental temperature changes or the camera module operation can cause changes in the temperature around the infrared detector. The temperature changes around the infrared detector can cause changes in the infrared energy around the infrared detector, thereby affecting the reception of the infrared rays of the object by the infrared detector. For example, after the camera module is started, the components of the camera module generate energy to emit the infrared rays. After the infrared detector receives the infrared rays from the components and the object, the infrared detector cannot identify the infrared rays of the object, it is not possible to accurately generate thermal imaging images of the object.

In order to improve detection accuracy of the infrared detector, the infrared camera stores a ratio of the temperatures inside and outside the housing when they are in equilibrium. When the temperature inside and outside the housing of the camera module reaches an equilibrium state, the infrared camera can identify the temperature generated by the infrared rays of the object obtained by the infrared detector based on relevant algorithms. The infrared camera is able to obtain an exact temperature of the object to enable more accurate thermograms to be generated based on the exact temperature.

The camera module relies mainly on temperature conduction or air convection in the device itself to keep the temperature in an exterior of the housing and the temperature in an interior of the housing in equilibrium, a process that takes about 15 to 20 minutes, a process that is too long.

The present disclosure provides a camera module and an electronic device. The present disclosure enables the camera module to reach the ratio between the temperature in the exterior of the housing and the temperature in the interior of the housing at equilibrium state more quickly.

Figure 2:
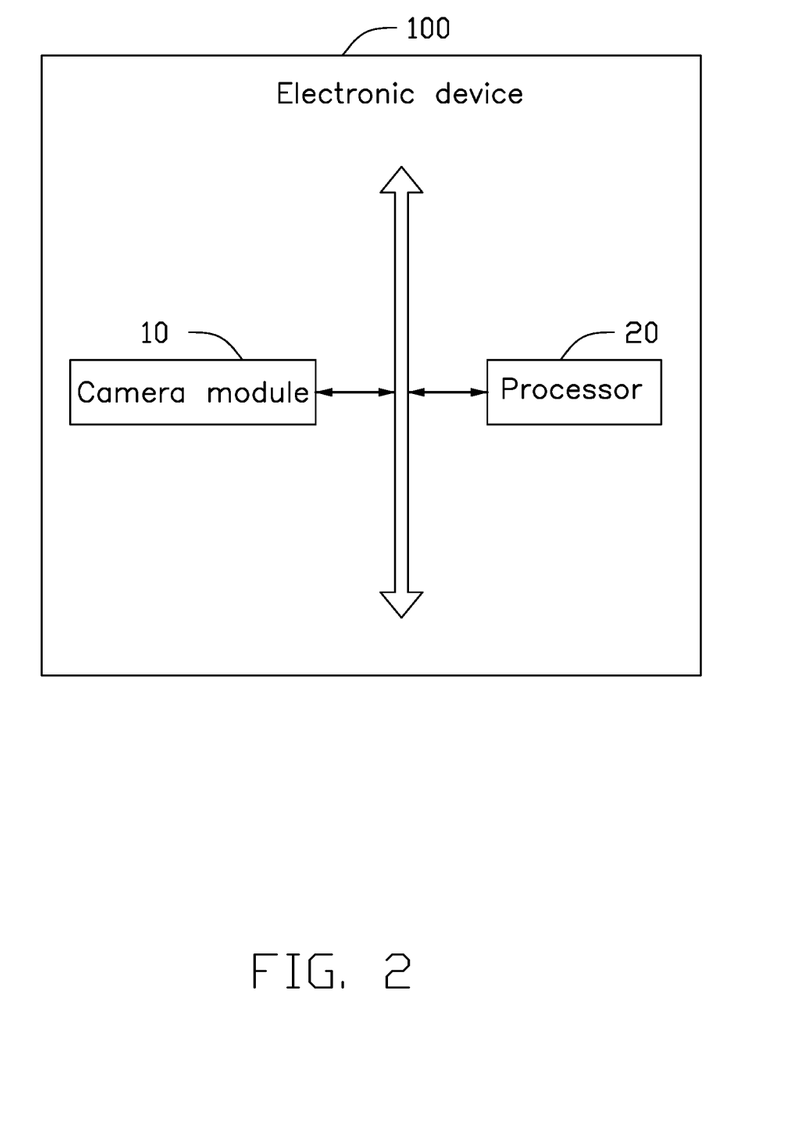
FIG. 2 is a schematic diagram of an electronic device based on an embodiment of the present disclosure.

FIG. 2 illustrates an electronic device 100 in accordance with an embodiment of the present disclosure.

Figure 3:
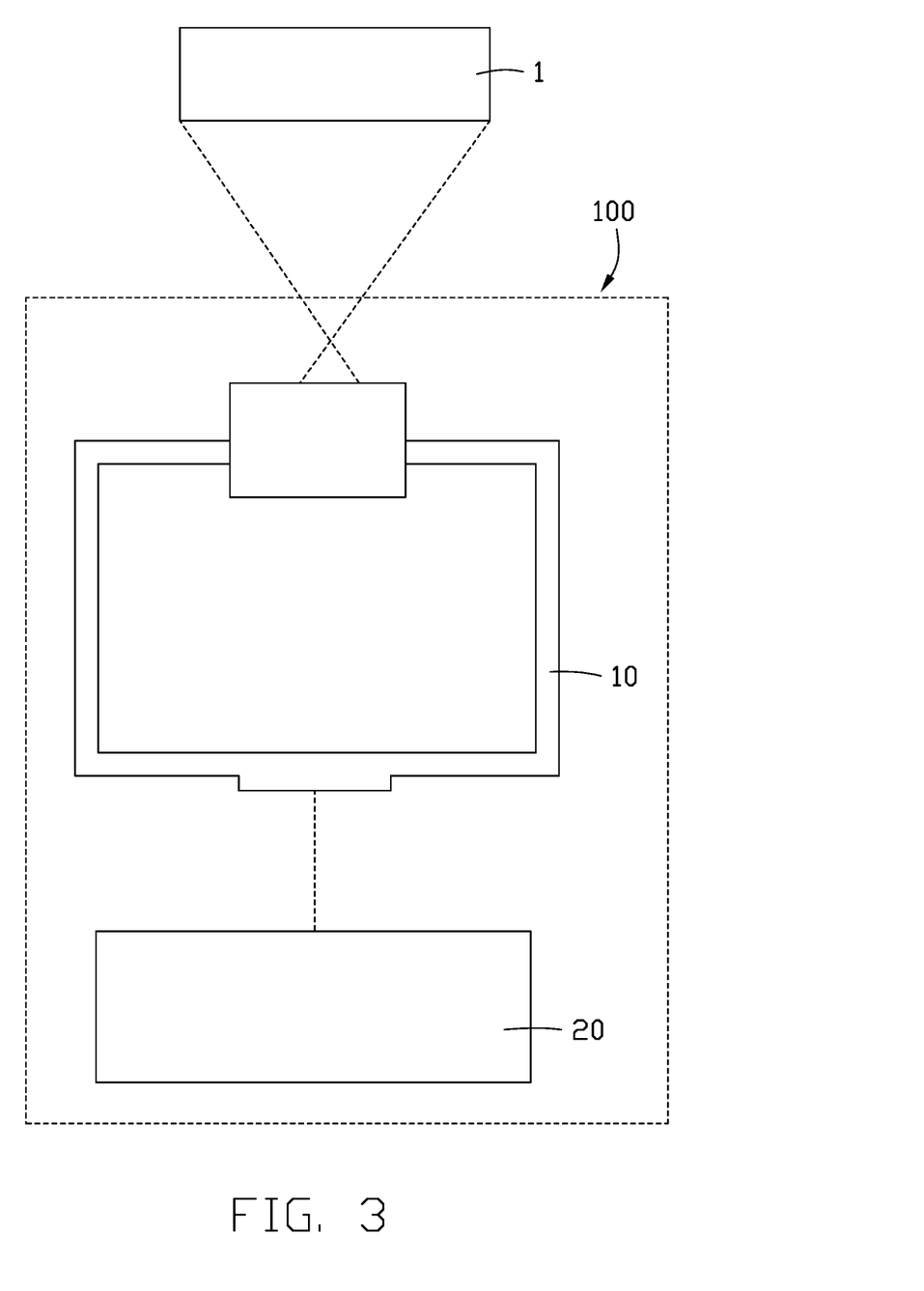
FIG. 3 is another schematic diagram of the electronic device based on an embodiment of the present disclosure.

The electronic device 100 includes a camera module 10 and a processor 20. The camera module 10 is communicatively connected to the processor 20. As shown in FIG. 3, the infrared rays radiated by the object 1 are incident into the camera module 10, and the camera module 10 is used to obtain the infrared rays radiated by the object 1 and generate electrical signals based on the infrared rays, and then send the electrical signals to the processor 20. The processor 20 is used to generate a thermal imaging image of the object 1 based on the electrical signals.

The electronic device 100 can be, but is not limited to, infrared cameras, personal computers (PCs), personal digital assistants (PDAs), and mobile phones. The processor 20 can be, but is not limited to, a microcontroller unit (MCU) or a central process unit (CPU) and is not limited here. The processor 20 can be a cloud server, desktop computer, network server, service cluster, wireless terminal device, embedded device, or other device with data processing functions.

Figure 4:
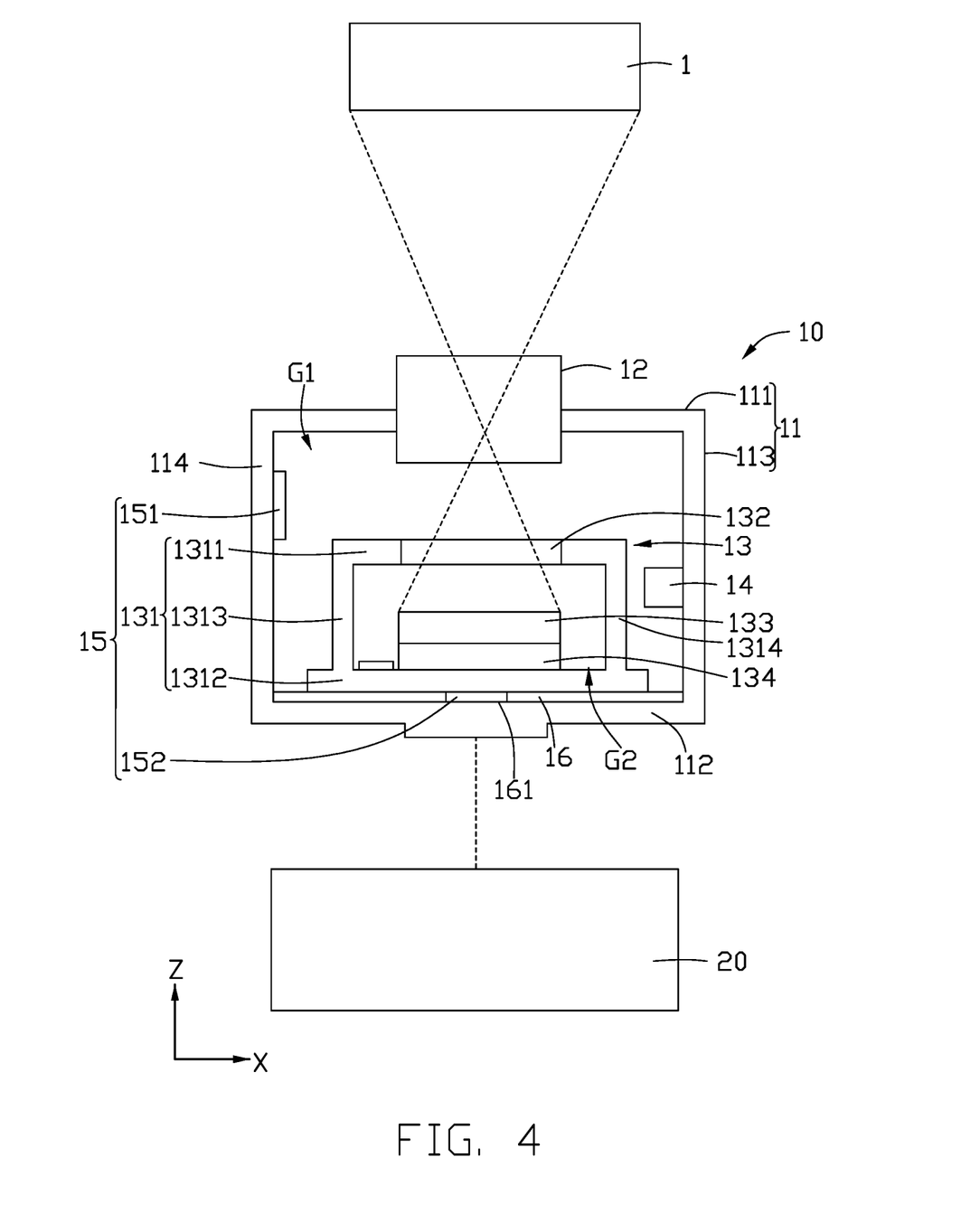
FIG. 4 is another schematic diagram of the electronic device based on an embodiment of the present disclosure.

FIG. 4 illustrates the camera module 10 in accordance with an embodiment of the present disclosure.

The camera module 10 includes a housing 11, a lens 12, an infrared detector 13, a temperature sensor 14 and a temperature adjusting device 15.

The housing 11 includes a top wall 111, a bottom wall 112, and a plurality of sidewalls. The top wall 111 is disposed opposite to the bottom wall 112. The present disclosure does not limit the number of the sidewalls, and the angles formed between the sidewalls can be equal or unequal.

Optionally, the top wall 111 is parallel to the bottom wall 112. For example, the top wall 111 and the bottom wall 112 are both disposed in a first direction (such as the X-axis direction of FIG. 4).

In one embodiment, the sidewalls include a first sidewall 113, a second sidewall 114, a third sidewall, and a fourth sidewall (the third sidewall and the fourth sidewall are not shown in figures). The first sidewall 113 is disposed opposite to the second sidewall 114, and the third sidewall is disposed opposite to the fourth sidewall. For example, the first sidewall 113, the second sidewall 114, the third sidewall, and the fourth sidewall are all vertically disposed along a second direction (such as the Z-axis direction of FIG. 4), or alternatively, they may not be vertically disposed. In the embodiment, one side of the third sidewall and the fourth sidewall are connected to the first sidewall 113, another side of the third sidewall and the fourth sidewall are connected to the second sidewall 114. One end of the first sidewall 113 and the second sidewall 114 are connected to the bottom wall 112, and another end of the first sidewall 113 and the second sidewall 114 are connected to the top wall 111 to form an accommodating space G1. The accommodating space G1 is used to accommodate various components of the camera module 10, for example, the accommodating space G1 is used to accommodate the lens 12, the infrared detector 13, the temperature sensor 14, and the temperature adjusting device 15.

The lens 12 is located on the top wall 111, for example, the lens 12 is located in the middle of the top wall 111. The lens 12 is used to transmit the infrared rays from the object 1 into the housing 11.

The infrared detector 13 is disposed opposite to the lens 12. When a first temperature in the interior of the housing 11 is adjusted to a target temperature, the infrared detector 13 detects the infrared rays of the object 1, and generates the electrical signals based on the energy change of the infrared rays of the object 1.

The infrared detector 13 includes a housing 131, an optical window 132, a Micro-Electro-Mechanical System (MEMS) component 133 and a substrate 134. The optical window 132 is located on the, and the optical window 132 is disposed opposite to the lens 12. The optical window 132 is parallel to the lens 12 to transmit the infrared rays from the housing 11 into the housing 131 of the infrared detector 13. The MEMS component 133 and the substrate 134 are accommodated in the housing 131.

The housing 131 includes a cover plate 1311, a bottom plate 1312, and a plurality of side plates. The cover plate 1311 is disposed opposite to the bottom plate 1312. The optical window 132 is located on the cover plate 1311, and the number of the side plates is not limited, and the angle formed between the side plates can be equal or unequal. The cover plate 1311 is parallel to the bottom plate 1312. For example, both the cover plate 1311 and the bottom plate 1312 are disposed in the first direction (such as the X-axis direction of FIG. 4).

It can be understood that the top wall 111, the bottom wall 112, the cover plate 1311, and the bottom plate 1312 are disposed in parallel, and the lens 12 located on the top wall 111 is opposite to the optical window 132 located on the cover plate 1311, so that the infrared rays can accurately and sequentially transmit from the lens 12 and the optical window 132 into the housing 131.

The cross-sectional length of the bottom plate 1312 can be greater than the cross-sectional length of the cover plate 1311. In one embodiment, the side plates include a first side plate 1313, a second side plate 1314, a third side plate, and a fourth side plate (the third side plate and the fourth side plate are not shown in figures). The first side plate 1313 is disposed opposite to the second side plate 1314, and the third side plate is disposed opposite to the fourth side plate. For example, the first side plate 1313, the second side plate 1314, the third side plate, and the fourth side plate are all vertically disposed in the second direction (such as the Z-axis direction of FIG. 4), or alternatively, they may not be vertically disposed.

In the embodiment, one side of the third side plate and the fourth side plate are connected to the first side plate 1313, and another side of the third side plate and the fourth side plate are connected to the second side plate 1314. One end of the first side plate 1313 and the second side plate 1314 are connected to the bottom plate 1312, and another end of the first side plate 1313 and the second side plate 1314 are connected to the cover plate 1311 to form an accommodating space G2, and the accommodating space G2 is used to accommodate the MEMS component 133 and the substrate 134.

The 134 is located on the bottom plate 1312, and the substrate 134 is disposed opposite to the optical window 132. The MEMS component 133 is disposed on the substrate 134, and the MEMS component 133 is disposed opposite to the optical window 132, so that the infrared rays transmitted into the housing 131 can accurate incident on the sensitive components of the MEMS component 133.

The MEMS component 133 may include a preamplifier and a plurality of sensitive elements prepared based on microelectromechanical system technology. The sensitive element generates the electrical signals based on an energy change generated by the infrared rays, and the number of the sensitive elements may be, for example, from 70,000 to 2,100,000. The MEMS component 133 can be integrated onto the substrate 134 to form a chip of the infrared detector 13 using application specific integrated circuit (ASIC) chip technology.

The temperature sensor 14 is located on an inner wall of the housing 11, and the temperature sensor 14 is used to sense the first temperature in the interior of the housing 11.

Specifically, the temperature sensor 14 can be located on one side of any of the top wall 111, the bottom wall 112, the first side wall 113, the second side wall 114, the third side wall or the fourth side wall. For example, as shown in FIG. 4, the temperature sensor 14 can be located on the side of the first sidewall 113 close to the infrared detector 13. In one embodiment, the temperature sensor 14 can be located on the side wall closest to the infrared detector 13, to improve sensitivity to the ambient temperature of the infrared detector 13.

The temperature adjusting device 15 is used to adjust the first temperature in the housing 11 to the target temperature when the first temperature is not equal to the target temperature.

The processor 20 is used to control the temperature sensor 14 to sense the first temperature in the interior of the housing 11. If the first temperature in the housing 11 is not equal to the target temperature, the temperature adjusting device 15 adjusts the first temperature to the target temperature. If the first temperature in the housing 11 is equal to the target temperature, the processor 20 controls the temperature adjusting device 15 not to adjust the first temperature.

The temperature sensor 14 can detect the first temperature in the interior of the housing 11 and a second temperature in the exterior of the housing 11 can be detected by a temperature sensor in the exterior of the housing 11.

When the first temperature in the interior of the housing 11 is adjusted to the target temperature, there is a preset ratio between the target temperature and the second temperature in the exterior of the housing, an equilibrium can be reached between the first temperature in the interior of the housing 11 and the second temperature in the exterior of the housing 11. The camera module 10 can identify the temperature generated by the infrared rays of the object 1 acquired by the infrared detector 13 based on the relevant algorithm. The camera module 10 can obtain an exact temperature of the object 1 in order to make the thermal imaging images generated based on the exact temperature more accurate.

Figure 5:
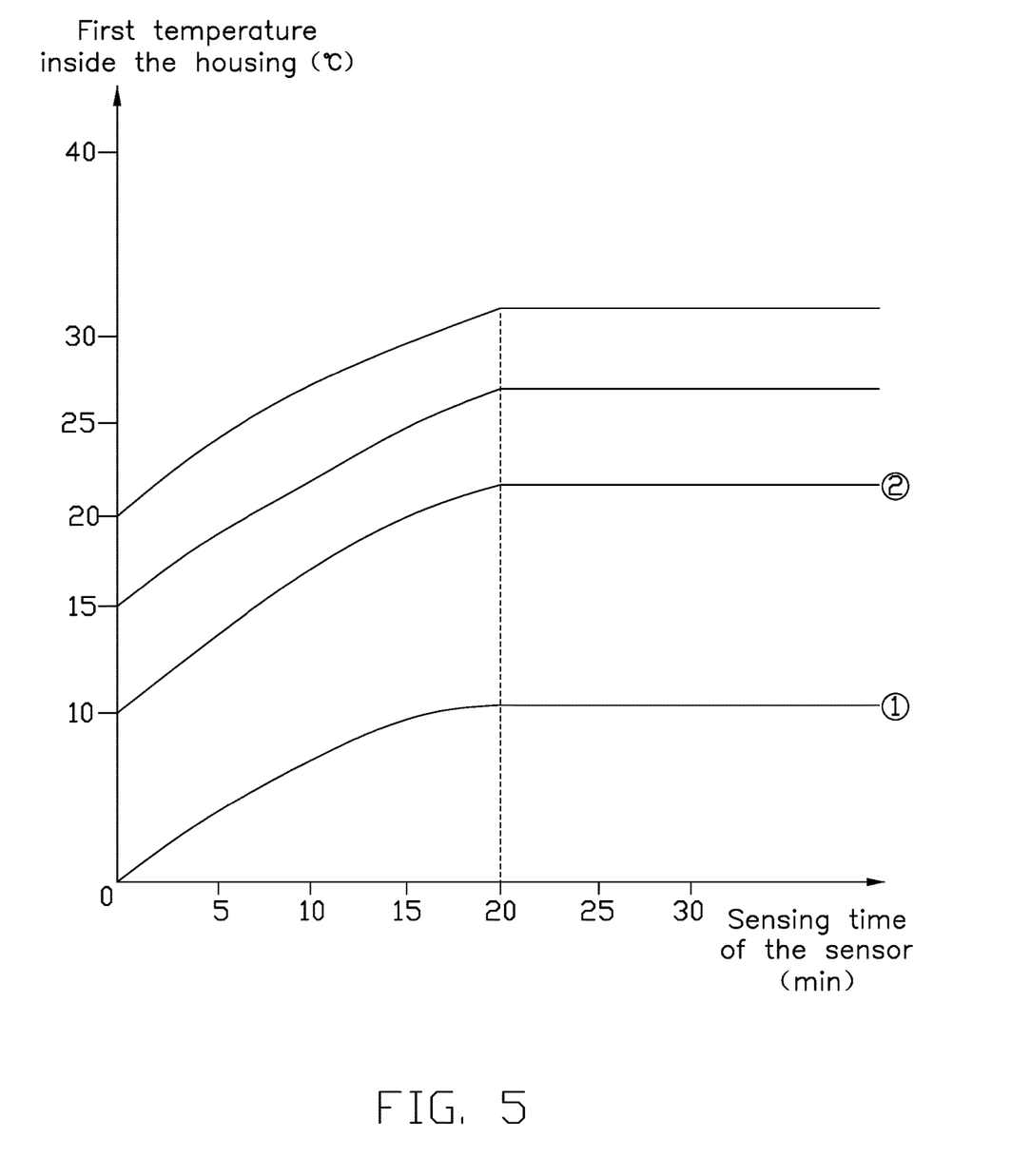
FIG. 5 is a schematic diagram of a temperature change within a housing of a camera module based on another embodiment of the present disclosure.

The target temperature can be set based on a relationship between the temperature in the exterior of the housing 11 and the temperature in the interior of the housing 11 in a temperature lookup table. The target temperature is different when the camera module 10 is in different scenarios. For example, as shown in FIG. 5, the vertical coordinate indicates the temperature in the interior of the housing 11 and the horizontal coordinate indicates the sensing time (min) of the temperature sensor 14, different curves in FIG. 5, representing the time and the temperature required for the first temperature in the interior of the housing 11 to reach the target temperature in different scenarios. The area of the curve where it flattens out is the first temperature at equilibrium. For example, curve ① indicates that, in a first scenario, the time required to ramp up the first temperature within the housing 11 from 0° C. to the target temperature at equilibrium is about 20 min, and the target temperature is about 10° C. Curve ② indicates that, in a second scenario, the time required to ramp up the first temperature within the housing 11 from 10° C. to the target temperature at equilibrium is about 20 min, and the target temperature is about 15° C.

The temperature change curve in FIG. 5 illustrates the time and the temperature required for the first temperature in the interior of the housing 11 to reach the equilibrium under the second temperature rise situation, there will also be a curve of the time and the temperature required for the first temperature in the interior of the housing 11 to reach the equilibrium under the second temperature drop.

In some embodiments, the processor 20 is used to control the temperature adjusting device 15 to stop adjusting the first temperature if the first temperature in the interior of the housing 11 is equal to the preset temperature.

The preset temperature can be obtained based on the experimental data. when the processor 20 controls the temperature adjusting device 15 to adjust the first temperature in the interior of the housing 11, and the processor 20 receives the first temperature detected by the temperature sensor 14 is a preset temperature, the temperature adjusting device 15 stops adjusting the first temperature in the interior of the housing 11.

The processor 20 is used to determine a change slope value of the first temperature in the housing 11 after a preset time.

The preset time can be obtained based on the experimental data. The change slope value of the first temperature refers to a slope of the curve shown in FIG. 5, which means that the change slope value of the first temperature can be obtained based on a first temperature difference between one period and another period. For example, the slope of curve ① within 0 to 20 minutes is 10÷20=0.5. Due to just adjusting the first temperature in the interior of the housing 11, the change slope value of the first temperature is unstable. Therefore, it is possible to determine the change slope value of the first temperature in the housing 11 after stopping for the preset time.

The processor 20 can control the temperature sensor 14 to detect the first temperature in the interior of the housing 11 after stopping the preset time for adjusting the first temperature, and the processor 20 determines the change slope value based on the time and the first temperature detected by the temperature sensor 14.

The processor 20 is used to determine that the first temperature is the target temperature if the change slope value is less than a preset value.

The preset value is the slope of the first temperature when the temperature in the interior of the housing 11 and the temperature in the exterior of the housing 11 reach an equilibrium state. Since the temperature in the interior of the housing 11 and the temperature in the exterior of the housing 11 reach the equilibrium state, the first temperature in the interior of the housing 11 is less affected by the second temperature in the exterior of the housing 11, and the first temperature change inside the housing 11 of the camera module 10 trends to stabilize. Therefore, the slope at equilibrium will be less than a certain value. As shown in FIG. 5, it is in an unbalanced state before 20 minutes and in equilibrium after 20 minutes, and the slope before 20 minutes is greater than the slope after 20 minutes.

When the change slope value is less than the preset value, the processor 20 can determine that the first temperature is the target temperature, and the processor 20 can control the temperature adjusting device 15 to stop adjusting the first temperature in the interior of the housing 11.

The present disclosure divides the entire process of adjusting the first temperature to the target temperature into multiple times, which can avoid adjusting the temperature far beyond the target temperature after one adjustment.

In some embodiments, when the change slope value is greater than the preset value, the processor 20 is used to control the temperature adjusting device 15 to adjust the first temperature until the change slope is less than the preset value.

If the change slope value is greater than the preset value, it indicates that the first temperature in the interior of the housing 11 has undergone a significant change, and the first temperature has not stably reached the target temperature corresponding to the equilibrium state. Therefore, it is necessary to continue adjusting the first temperature. More specifically, the processor 20 can control the temperature adjusting device 15 to continue adjusting the first temperature in the interior of the housing 11 until the processor 20 determines that the change slope value is less than a preset value based on the time and the temperature detected by the temperature sensor 14, and the processor 20 can control the temperature adjusting device 15 to stop adjusting the first temperature in the interior of the housing 11.

The temperature adjusting device 15 includes a heater 151 and a refrigeration chip 152. The heater 151 is used to increase the first temperature when the first temperature is less than the target temperature. The refrigeration chip 152 is used to reduce the first temperature when the first temperature is greater than the target temperature.

The heater 151 can be disposed on the inner wall of the housing 11. The heater 151 can be disposed on the inner wall of the top wall 111, the bottom wall 112, the first sidewall 113, the second sidewall 114, the third sidewall or the fourth sidewall. For example, the heater 151 can be disposed on the inner wall of the side wall closest to the infrared detector 13 to accelerate the heating rate of the surrounding environment of the infrared detector 13. For example, the heater 151 is disposed on the side of the second sidewall 114 close to the infrared detector 13.

The refrigeration chip 152 can be disposed between the bottom wall 112 of the housing 11 and the bottom plate 1312 of the infrared detector 13 to accelerate the cooling rate of the surrounding environment of the infrared detector 13.

A circuit board 16 can be disposed between the bottom wall 112 of the housing 11 and the bottom plate 1312 of the infrared detector 13. The circuit board 16 defines a receiving slot 161, and the receiving slot 161 is used to receive the refrigeration chip 152. The circuit board 16 can be a printed circuit board (PCB), and the electrical signal generated by the infrared detector 13 is sent to the processor 20 through the circuit board 16.

In some embodiments, the processor 20 is used to control the heater 151 to increase the first temperature in the interior of the housing 11 to reach the target temperature when the first temperature in the interior of the housing 11 is less than the target temperature.

The processor 20 detects the first temperature inside the housing 11 through the temperature sensor 14 and determines that the first temperature is less than the target temperature, and controls the heater 151 to increase the first temperature in the interior of the housing 11 to the target temperature.

For example, the camera module 10 starts working, and the processor 20 controls the heater 151 to increase the first temperature in the interior of the housing 11 while receiving the first temperature detected by the temperature sensor 14. When the first temperature is a preset temperature, the processor 20 controls the heater 151 to stop increasing the first temperature in the interior of the housing 11. After the processor 20 stops increasing the first temperature inside the housing 11 for a preset time, the processor 20 controls the temperature sensor 14 to detect the first temperature in the interior of the housing 11. The processor 20 determines the change slope value based on the time and the first temperature detected by the temperature sensor 14. When the change slope value is less than the preset value, the processor 20 can determine that the first temperature is the target temperature. When the change slope value is greater than the preset value, the processor 20 controls the heater 151 to continue increasing the first temperature in the interior of the housing 11. By analogy, until the change slope value is less than the preset value, the processor 20 controls the heater 151 to stop increasing the first temperature in the interior of the housing 11.

When the camera module 10 is working, the components of the camera module 10 will start to heat up, causing the first temperature in the interior of the housing 11 to increase. The temperature rise is too slow to reach the first temperature in the interior of the housing 11 that is required when the temperature in the interior of the housing and the temperatures in the exterior of the housing 11 reach equilibrium. Therefore, the processor 20 can control the heater 151 to increase the first temperature in the interior of the housing 11 to the target temperature, in order to accelerate reaching the equilibrium state.

In another example, the camera module 10 operates normally, and the temperature in the exterior of the housing 11 of the camera module 10 rapidly rises from 0° C. to 25° C., the processor 20 repeats the action of the previous example until the change slope value is less than the preset value and controls the heater 151 to stop increasing the first temperature in the interior of the housing 11.

When the camera module 10 is working normally, the second temperature in the exterior of the housing 11 of the camera module 10 rapidly increases, which will break the balance between the inside and outside of the housing 11 of the camera module 10. Therefore, it is necessary for the processor 20 to control the heater 151 to increase the first temperature in the interior of the housing 11 to the target temperature, in order to accelerate reaching the equilibrium state.

In some embodiments, if the first temperature in the interior of the housing 11 of the camera module 10 is greater than the target temperature, the processor 20 is used to control the refrigeration chip 152 to reduce the first temperature, so that the first temperature reaches the target temperature.

The processor 20 detects the first temperature in the interior of the housing 11 through the temperature sensor 14, determines that the first temperature is greater than the target temperature and controls the refrigeration chip 152 to reduce the first temperature in the interior of the housing 11 to the target temperature.

For example, the camera module 10 starts working, the second temperature in the exterior of the housing 11 of the camera module 10 rapidly reduces from 25° C. to 0° C., and the processor 20 controls the refrigeration chip 152 to reduce the first temperature in the interior of the housing 11 while receiving the first temperature detected by the temperature sensor 14. When the first temperature is a preset temperature, the processor 20 controls the refrigeration chip 152 to stop reducing the first temperature in the interior of the housing 11. After the processor 20 stops reducing the first temperature in the interior of the housing 11 for a preset time, the processor 20 controls the temperature sensor 14 to detect the first temperature in the interior of the housing 11. The processor 20 determines the change slope value based on the time and the first temperature detected by the temperature sensor 14. When the change slope value is less than the preset value, the processor 20 can determine that the first temperature is the target temperature. When the change slope value is greater than the preset value, the processor 20 controls the refrigeration chip 152 to continue reducing the first temperature in the interior of the housing 11. By analogy, until the change slope value is less than the preset value, the processor 20 controls the refrigeration chip 152 to stop reducing the first temperature.

When the camera module 10 is working normally, the second temperature in the exterior of the housing 11 of the camera module 10 rapidly reduces, which will break the balance between the inside and outside of the housing 11 of the camera module 10. Therefore, it is necessary for the processor 20 to control the refrigeration chip 152 to reduce the first temperature in the interior of the housing 11 to the target temperature, in order to accelerate reaching the equilibrium state.

The processor 20 is used to control the infrared detector 13 to detect the infrared rays of the object 1 when the first temperature is adjusted to the target temperature.

The processor 20 is used to determine the temperature information corresponding to the infrared rays of the object 1 and generate a thermal imaging image of the object 1 based on the temperature information.

When the first temperature in the interior of the housing 11 of the camera module 10 is not equal to the target temperature, the processor 20 adjusts the first temperature to the target temperature, thereby achieving a balance between the temperature in the interior of the housing 11 and the temperature in the exterior of the housing 11. When the first temperature is the target temperature, the infrared rays from the object can be detected, the processor 20 can obtain accurate temperature information corresponding to the infrared rays of the object 1, and accurate thermal imaging images of the object 1 can be generated based on the accurate temperature information.

After obtaining the electrical signal generated by the infrared detector 13 based on the infrared rays, the processor 20 determines the temperature information of the object 1 based on the electrical signal and the relevant algorithms and generates a thermal imaging image of the object 1 based on the temperature information.

When the first temperature in the interior of the housing 11 of the camera module 10 is equal to the target temperature, it indicates that the temperature in the interior of the housing 11 and the temperature in the exterior of the housing 11 have reached an equilibrium state, and the processor 20 is able to obtain the accurate temperature of the object 1.

Since the processor 20 can obtain the first temperature through the temperature sensor 14 and adjust the first temperature according to the temperature adjusting device 15, the temperature in the interior of the housing and the temperature in the exterior of the housing 11 of the camera module 10 can quickly reach the equilibrium state. Therefore, the infrared detector 13 can be activated faster to detect the infrared rays from the object 1, calculate the accurate temperature, and generate a thermal imaging image of the object 1, and the thermal imaging image displays more accurately.

In order to accelerate the thermal conductivity of the camera module 10, larger materials such as thermal conductivity plates will be added, resulting in a larger volume of the camera module 10. The present disclosure utilizes the cooperation between the temperature sensor 14 and the temperature adjusting device 15 to quickly adjust the temperature in the interior of the housing 11 to reach an equilibrium state, reducing the increase of materials with larger volume such as thermal conductivity plates and reducing the overall volume of the camera module 10.

The following will explain an application process of the electronic device of the present disclosure through an application scenario.

Figure 6:
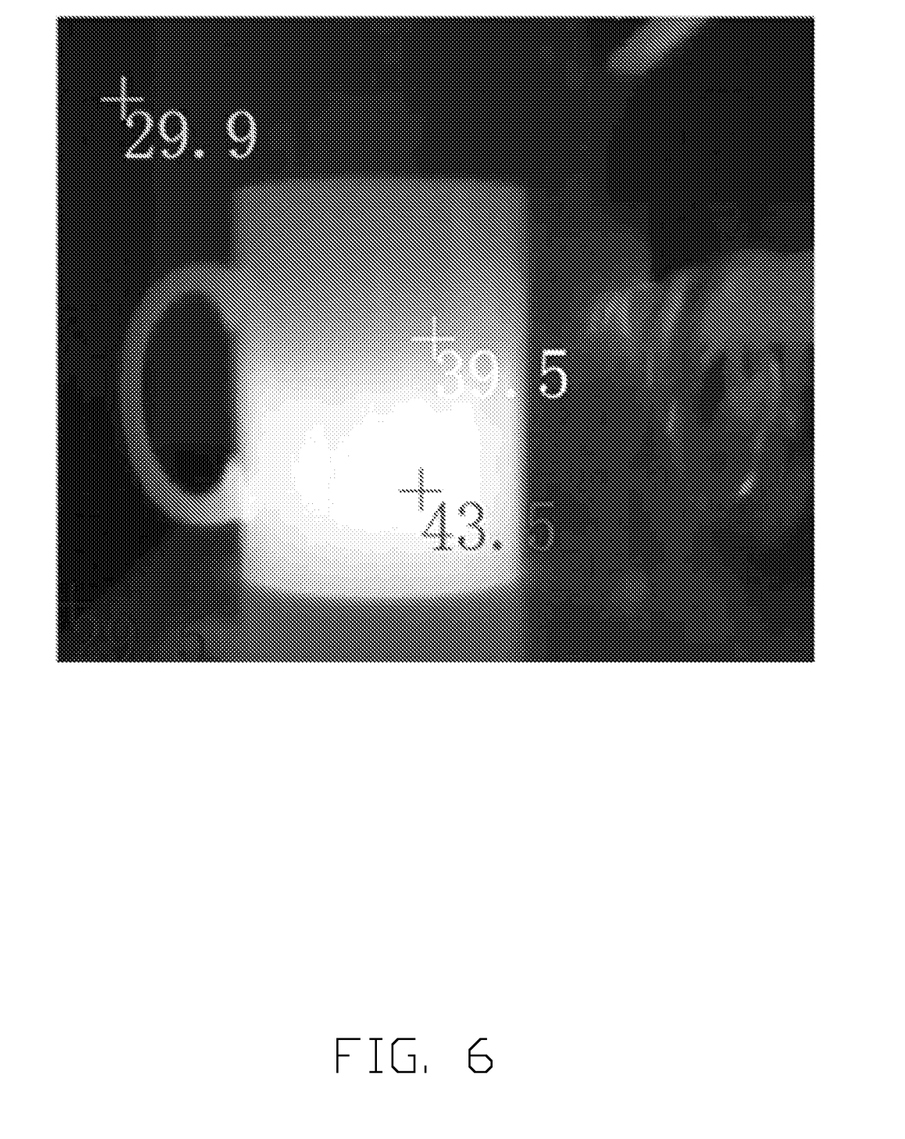
FIG. 6 is a scene diagram of the electronic device shown in FIG. 3.

The electronic device 100 includes a camera module 10 and a processor 20. The camera module 10 operates normally and the temperature in the interior of housing 11 and the temperature in the exterior of the housing 11 reach an equilibrium state. A cup is the object 1, and the cup radiates the infrared rays, and the infrared rays are projected from the lens of the camera module 10 into the housing 11 and transmitted into the MEMS component 133 of the infrared detector 13. The sensitive elements of the MEMS component 133 generate the electrical signal based on the energy change of the infrared rays, and the electrical signal can be sent to the processor 20 through the circuit board 16. At this time, the temperature in the exterior of the housing 11 of the camera module 10 changes suddenly, the temperature in the interior of the housing 11 and the temperature in the exterior of the housing 11 is not in equilibrium, and the thermal imaging image of the cup is displayed inaccurately. The processor 20 controls the infrared detector 13 to stop detecting the cup radiating the infrared rays, and the processor 20 receives a first temperature in the interior of the housing 11 through the temperature sensor 14 and controls the temperature adjusting device 15 to adjust the first temperature to target temperature, and the temperature inside housing 11 and the temperature in the exterior of the housing 11 reach the equilibrium state. The processor 20 controls the infrared detector 13 to detect the cup radiating the infrared rays, determines the temperature information generated by the infrared rays of the cup according to the relevant algorithms, processes the temperature information, and generates a thermal imaging image of the cup, which is shown in FIG. 6.

In the above application scenario, the infrared detector 13 is an uncooled infrared focal plane detector, the preparation material of the camera module 10 is ferroelectric vanadium oxide mixture (F-VOx), with a response in the infrared band of 8 to 14 μm, the resolution is 320×240, the detection diameter is 4.8 m, and the pixel spacing is 12 μm, the temperature sensitivity is NETD<70 mK, the lens aperture is F1.2, the effective focal length is 6.8 mm, and the field of view angle is (H*V)=(34.8°*26°).

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A camera module comprising:
    a housing;
    a temperature sensor disposed in an interior of the housing and the temperature sensor configured to sense a first temperature;
    a temperature adjusting device disposed in the interior of the housing, wherein the temperature adjusting device is configured to reduce the first temperature to a target temperature when the first temperature is higher than the target temperature, the temperature adjusting device is further configured to increase the first temperature to the target temperature when the first temperature is lower than the target temperature, and a ratio between the target temperature and a second temperature in an exterior interior of the housing meets a preset ratio;
    an infrared detector disposed in the interior of the housing and the infrared detector configured to detect infrared rays of an object when the first temperature is adjusted to the target temperature.

2. The camera module of claim 1, wherein the temperature adjusting device comprises a heater, the heater is disposed inside the housing, and the heater is configured to increase the first temperature when the first temperature is lower than the target temperature.

3. The camera module of claim 1, wherein the temperature adjusting device further comprises a refrigeration chip, the refrigeration chip is disposed between a bottom plate of the infrared detector and a bottom wall of the housing.

4. The camera module of claim 3, wherein the refrigeration chip is configured to reduce the first temperature when the first temperature is higher than the target temperature.

5. The camera module of claim 4, further comprising a circuit board, the circuit board is disposed between the bottom plate of the infrared detector and the bottom wall of the housing.

6. The camera module of claim 5, wherein the circuit board defines a receiving slot, the receiving slot is configured to receive the refrigeration chip.

7. A camera module comprising:
a housing;
a temperature sensor disposed in an interior of the housing and the temperature sensor configured to sense a first temperature;
a temperature adjusting device disposed in the interior of the housing, wherein the temperature adjusting device is configured to reduce the first temperature to a target temperature when the first temperature is higher than the target temperature, the temperature adjusting device is further configured to increase the first temperature to the target temperature when the first temperature is lower than the target temperature, and a ratio between the target temperature and a second temperature in an exterior interior of the housing meets a preset ratio;
an infrared detector disposed in the interior of the housing and the infrared detector configured to detect infrared rays of an object when the first temperature is adjusted to the target temperature,
wherein the temperature adjusting device comprises a heater, the heater is disposed inside the housing, and the heater is configured to increase the first temperature when the first temperature is lower than the target temperature.

8. The camera module of claim 7, wherein the temperature adjusting device further comprises a refrigeration chip, the refrigeration chip is disposed between a bottom plate of the infrared detector and a bottom wall of the housing.

9. The camera module of claim 8, wherein the refrigeration chip is configured to reduce the first temperature when the first temperature is higher than the target temperature.

10. The camera module of claim 9, further comprising a circuit board, the circuit board is disposed between the bottom plate of the infrared detector and the bottom wall of the housing.

11. The camera module of claim 10, wherein the circuit board defines a receiving slot, the receiving slot is configured to receive the refrigeration chip.

12. An electronic device comprising:
a camera module comprising a housing, a temperature sensor, a temperature adjusting device, and an infrared detector, the temperature sensor disposed in an interior of the housing and the temperature sensor configured to sense a first temperature, the temperature adjusting device disposed in the interior of the housing, wherein the temperature adjusting device is configured to reduce the first temperature to a target temperature when the first temperature is higher than the target temperature, the temperature adjusting device is further configured to increase the first temperature to the target temperature when the first temperature is lower than the target temperature, and a ratio between the target temperature and a second temperature in an exterior interior of the housing meets a preset ratio; and the infrared detector disposed in the interior of the housing and the infrared detector configured to detect infrared rays of an object when the first temperature is adjusted to the target temperature; and
a processor configured to control the temperature sensor to sense the first temperature, the processor further configured to control the temperature adjusting device to adjust the first temperature to the target temperature if the first temperature is not equal to the target temperature.

13. The electronic device of claim 12, wherein the processor is further configured to control the temperature adjusting device to stop adjusting the first temperature if the first temperature is equal to a preset temperature.

14. The electronic device of claim 13, wherein the processor is further configured to determine a change slope value of the first temperature after a preset time, and the processor is further configured to determine the first temperature is the target temperature when the change slope value is less than the preset value.

15. The electronic device of claim 14, wherein the processor is further configured to control the temperature adjusting device to adjust the first temperature until the change slope value is less than the preset value when the change slope value is greater than the preset value.

16. The electronic device of claim 15, wherein the temperature adjusting device comprises a heater, the processor is further configured to control the heater to increase the first temperature when the first temperature is less than the target temperature, so that the first temperature is adjusted to the target temperature.

17. The electronic device of claim 15, wherein the temperature adjusting device further comprises a refrigeration chip, the processor is further configured to control the refrigeration chip to reduce the first temperature when the first temperature is greater than the target temperature, so that the first temperature is adjusted to the target temperature.

18. The electronic device of claim 15, wherein the processor is further configured to control the infrared detector to detect the infrared rays of the object when the first temperature is adjusted to the target temperature, determine temperature information corresponding to the infrared rays of the object, and generate a thermal imaging image of the object based on the temperature information.

* * * * *